United States Patent Office.

HENRY M. MYERS, OF ALLEGHENY CITY, PENNSYLVANIA.

Letters Patent No. 91,477, dated June 15, 1869.

IMPROVED METHOD OF COATING HINGES WITH TIN

The Schedule referred to in these Letters Patent and making part of the same.

*To all whom it may concern:*

Be it known that I, HENRY M. MYERS, of the city and county of Allegheny, in the State of Pennsylvania, have invented a new and useful Improvement, viz, "Coating Hinges with Tin;" and I do hereby declare that the following is a full, clear, and exact description thereof.

The nature of my invention consists in coating hinges with tin, in the manner hereinafter described.

To enable others skilled in the art to make and use my invention, I will proceed to describe my process for coating hinges with tin.

I take wrought-iron hinges, of any known form, and thoroughly clean them, by washing them in a liquid, consisting of water, nine (9) parts, and sulphuric acid, one (1) part. The hinges are then dried, after which they are immersed in muriatic acid, in which has been dissolved as much zinc as the muriatic acid will "cut," or hold in solution.

The hinges, after being immersed in the solution of muriatic acid and zinc, are allowed to drip until the surplus of the solution has ceased to drop from the hinges.

They are then immersed in a bath of melted tin, zinc, and antimony, in the following proportions: Block-tin, ninety-eight (98) parts; zinc, one (1) part; antimony, one (1) part.

After the hinges have been immersed in this mixture of melted metals, they are, while hot, immersed in a bath, consisting of a solution of sal-ammoniac and water, in proportions as follows: one-half (½) pound of sal-ammoniac to one (1) gallon of water.

The hinges, after being immersed in the solution of sal-ammoniac and water, are "dried off" in sawdust, after which they are packed in paper or boxes.

Hinges coated, or "tinned" in the manner hereinbefore described, will have a very smooth surface and silver-like appearance, and will not be liable to tarnish or change in their appearance by the action of the atmosphere.

The advantage of coating hinges with a durable metallic coating, as described, consists in making the hinges more durable, preventing them from becoming rusty, which rust causes the wood to decay and become rotten, and thereby loosens the hinge from its hold. Hinges coated in the manner described are beautiful in appearance, and will therefore be well adapted to a great variety of fine work, such as hinges for well-finished doors, shutters, desks, bookcases, wardrobes, &c.

Having thus described the nature of my improvement,

What I claim as my invention, is—

Coating hinges with tin, as herein described, and for the purpose set forth.

H. M. MYERS.

Witnesses:
JAMES J. JOHNSTON,
AARON B. CATE.